(12) United States Patent
Hasegawa et al.

(10) Patent No.: US 9,682,779 B2
(45) Date of Patent: Jun. 20, 2017

(54) VEHICLE SEAT

(71) Applicant: RECARO Aircraft Seating GmbH & Co. KG., Schwaebisch Hall (DE)

(72) Inventors: Satoshi Hasegawa, Untergruppenbach (DE); Djunianto Ko, Schwaebisch Hall (DE); Jochen Lohrmann, Waiblingen (DE); Juri Vnukovski, Pfedelbach (DE); Vasco Broenner, Michelfeld-Neunkirchen (DE); Timea Roderwald-Vincze, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 14/059,610

(22) Filed: Oct. 22, 2013

(65) Prior Publication Data

US 2014/0110982 A1    Apr. 24, 2014

(30) Foreign Application Priority Data

Oct. 24, 2012    (DE) .................. 10 2012 020 847

(51) Int. Cl.
    *B64D 11/06*    (2006.01)
(52) U.S. Cl.
    CPC .......... *B64D 11/06* (2013.01); *B64D 11/0604* (2014.12); *B64D 11/0606* (2014.12); *B64D 11/0641* (2014.12); *B64D 11/0643* (2014.12)
(58) Field of Classification Search
    USPC ................ 297/63, 64, 118; 244/118.5, 118.6
    See application file for complete search history.

(56) References Cited

U.S. PATENT DOCUMENTS

| 7,318,622 | B2 * | 1/2008 | Rezag et al. .................. 297/118 |
| 7,354,018 | B2 | 4/2008 | Saint-Jalmes |
| 7,837,262 | B2 | 11/2010 | Merensky |
| 7,946,532 | B2 | 5/2011 | Martin |
| 8,011,723 | B2 * | 9/2011 | Park et al. .................... 297/118 |
| 8,662,447 | B2 * | 3/2014 | Johnson et al. ........... 244/118.6 |
| 8,746,617 | B2 | 6/2014 | Beal |

(Continued)

FOREIGN PATENT DOCUMENTS

| EP | 1 707 486 A1 | 10/2006 |
| EP | 1 759 991 A1 | 3/2007 |

(Continued)

OTHER PUBLICATIONS

Extended European Search Report dated Apr. 25, 2014 issued in the corresponding EP patent application No. 13186395.3-1754 (with partial English translation).

(Continued)

*Primary Examiner* — Sarah McPartlin
(74) *Attorney, Agent, or Firm* — Posz Law Group, PLC (57) ABSTRACT

A vehicle seat, in particular an aircraft seat, includes at least one seating device, which has at least one seat unit and at least one bench unit, which is arranged at one side of the seat unit in a transverse direction oriented at least substantially perpendicular to a seat unit longitudinal direction. The bench unit, in at least one seat position, can have at least one bench unit section which projects rearward beyond the seat unit in relation to the seat unit longitudinal direction.

19 Claims, 3 Drawing Sheets

(56) References Cited

U.S. PATENT DOCUMENTS

| | | | |
|---|---|---|---|
| 8,882,036 B2* | 11/2014 | Henshaw | B64D 11/06 244/118.6 |
| 2007/0152100 A1 | 7/2007 | Saint-Jalmes et al. | |
| 2008/0088160 A1* | 4/2008 | Johnson | 297/240 |
| 2009/0146005 A1* | 6/2009 | Bettell | 244/118.6 |
| 2010/0065683 A1* | 3/2010 | Darbyshire | 244/118.6 |
| 2011/0011977 A1* | 1/2011 | Olliges | 244/118.6 |
| 2012/0223186 A1 | 9/2012 | Henshaw | |
| 2012/0305705 A1* | 12/2012 | Vergnaud et al. | 244/118.6 |

FOREIGN PATENT DOCUMENTS

| | | |
|---|---|---|
| EP | 2 275 345 A1 | 1/2011 |
| EP | 2234884 B1 | 2/2012 |
| FR | 2 842 497 A1 | 1/2004 |
| FR | 2 942 456 A1 | 8/2010 |
| WO | 2005/080196 A1 | 9/2005 |
| WO | 2007/061381 A1 | 5/2007 |
| WO | 2012/140515 A1 | 10/2012 |

OTHER PUBLICATIONS

German Search Report dated Jun. 16, 2013 issued in the corresponding DE patent application No. 10 2012 020 8472 (with English translation).

\* cited by examiner

VEHICLE SEAT

CROSS REFERENCE TO RELATED APPLICATION

This application is based on and incorporates herein by reference German Patent Application No. 10 2012 020 847.2 filed on Oct. 24, 2012.

PRIOR ART

The invention relates to a vehicle seat in particular an aircraft seat.

A vehicle seat, in particular an aircraft seat, having at least one seating device, which has at least one seat unit and at least one bench unit, which is arranged at one side of the seat unit in a transverse direction oriented at least substantially perpendicular to a seat unit longitudinal direction, has already been proposed.

The object of the invention is, in particular, to provide a device of the type in question with improved properties as regards comfort for a passenger. According to the invention, the object is achieved by the features of Patent Claim 1, while advantageous embodiments and developments of the invention can be found in the subclaims.

Advantages of the Invention

The invention starts from a vehicle seat, in particular an aircraft seat, having at least one seating device, which has at least one seat unit and at least one bench unit, which is arranged at one side of the seat unit in a transverse direction oriented at least substantially perpendicular to a seat unit longitudinal direction.

It is proposed that the bench unit, in at least one seat position, have at least one bench unit section which projects rearward beyond the seat unit in relation to the seat unit longitudinal direction. The term. "bench unit" is intended, in particular, to mean a unit which has at least one bench unit surface. In particular, the bench unit surface is designed as a seating surface. The bench unit surface is preferably designed as a lying surface. In particular, the bench unit is designed as a piece of side furniture for the seat unit. In an upright position of the seat unit, the bench unit is preferably arranged at one side of the seat bottom unit of the seat unit in relation to the transverse direction. In particular, the bench unit is arranged at least in large part laterally adjacent to the seat unit in a transverse direction oriented at least substantially perpendicular to a seat unit longitudinal direction. In at least one upright seat position, referred to as the normal position, in which a backrest unit of the seat unit is oriented at least substantially perpendicular to a floor, in particular to a stand surface of the seat unit, a major part of the bench unit is preferably arranged laterally adjacent to the seat unit in relation to the transverse direction. In particular, the major part of the bench unit is arranged laterally adjacent to the seat unit in relation to the transverse direction in at least one seat position, referred to as the comfort position, in which a backrest unit of the seat unit is oriented at least substantially parallel to the floor. In particular, the bench unit is arranged adjacent to a side region of the seat unit. The side region of the seat unit preferably forms a lateral boundary of the seat unit in relation to the transverse direction. In particular, the side region of the seat unit has at least one longitudinal extent which, in at least one upright position of the backrest unit of the seat unit, encloses an angle in a range of from 75° to 105° with a surface formed by a major part of the backrest unit. In particular, a straight line oriented at least substantially parallel to the transverse direction, starting from a central point of the seat bottom unit direction, first of all intersects the side region of the side unit and, as it progresses further in the transverse direction, intersects the bench unit. The bench unit is preferably provided for use as a deposition surface, e.g. for hand luggage and/or clothing of a passenger sitting on the seat unit. In particular, the bench unit surface of the bench unit is provided for use as a seating surface for a child accompanying the passenger sitting on the seat unit. The bench unit is preferably provided for use as the lying surface for the passenger sitting on the seat unit. The phrase stating that a straight line and/or a plane is oriented. "at least substantially perpendicular" to a further straight line and/or plane formed separately from the first straight line and/or plane is intended, in particular, to mean that the straight line and/or plane encloses an angle with the further straight line and/or plane which deviates by less than 15°, preferably by less than 10°, and, in particular, by less than 5° from an angle of 90°. The term "seat unit longitudinal direction" is intended, in particular, to mean a direction which is oriented at least substantially parallel to a sitting direction. The term "sitting direction" is intended, in particular, to mean a direction which corresponds substantially to the direction in which the thighs of a passenger extend from the buttocks to the knee area when said passenger is sitting properly, in particular when the thighs of the passenger are oriented in parallel. In an upright position of the seat unit, in which the backrest unit is oriented at least substantially perpendicular to a floor, the sitting direction is oriented at least substantially parallel to the floor and at least substantially perpendicular to the backrest surface formed by the backrest unit. If the seating device is used for an aircraft passenger seat, the sitting direction typically corresponds to the direction of flight. The phrase stating that a straight line and/or plane is oriented "at least substantially parallel" to a further straight line and/or plane formed separately from the first straight line and/or plane is intended, in particular, to mean that the straight line and/or plane encloses an angle with the further straight line and/or plane which deviates by less than 5°, preferably by less than 3°, and, in particular, by less than 1° from an angle of 0°. The term "transverse direction" is intended, in particular, to mean a direction which is oriented at least substantially perpendicular to the seat unit longitudinal direction. In particular, the transverse direction is oriented at least substantially perpendicular to the sitting direction. The transverse direction is preferably oriented at least substantially parallel to the floor, in particular to the stand surface of the seat unit. The word "side" of the seat unit is intended, in particular, to mean a seat unit region which forms a boundary of the seat unit. The phrase stating that the bench unit section of the bench unit "projects rearward beyond the seat unit in relation to the seat unit longitudinal direction" in at least one seat position is intended, in particular, to mean that, in the seat position, a tangent to one side of the seat unit in which the backrest unit of the seat unit is arranged intersects the bench unit and divides it into at least two sections, wherein one of the sections is arranged on a side of the tangent situated in the seat unit longitudinal direction, and the bench unit section which projects rearward beyond the seat unit in relation to the seat unit longitudinal direction is arranged on a side of the tangent opposite the side of the tangent situated in the seat unit longitudinal direction. In particular, the tangent to the side of the seat unit in which the backrest unit of the seat unit is arranged is oriented at least substantially parallel to the transverse direction. The word "provided" is intended, in particular, to mean specifically designed and/or equipped. By means of an embodiment according to the invention, it is advantageously possible to provide a vehicle seat having as much room as possible for a passenger, in particular even when the seats are placed close together in a passenger cabin in which the vehicle seat is arranged, thereby making it possible to increase comfort for the passenger. Moreover, it is advantageously possible to use a vehicle seat flexibly as a seating surface, as a lying surface and/or as a deposition surface. It is furthermore advantageously possible to make available the bench unit as a storage space for objects belonging to the passenger.

It is furthermore proposed that the bench unit have a bench unit surface which forms, in at least one seat position, a lying surface with at least one seat bottom unit of the seat unit. In particular, in the seat position the bench unit surface is arranged at least substantially in a plane defined by the seat bottom unit of the seat unit. In the seat position in which the bench unit section projects rearward beyond the seat unit in relation to the seat unit longitudinal direction, the bench unit section preferably forms part of the bench unit surface. In particular, in the seat position the bench unit section forms part of the lying surface. In the seat position, the bench unit section is preferably arranged at least substantially in the plane defined by the seat bottom unit of the seat unit. The phrase stating that the bench unit surface is "arranged at least substantially in a plane defined by a seat bottom unit of the seat unit", in at least one seat position, is intended, in particular, to mean that more than 70%, preferably more than 80%, and, in particular, more than 90% of the bench unit surface is arranged in the plane defined by the seat bottom unit of the seat unit. By means of an embodiment according to the invention, it is advantageously possible to provide a large lying surface, on which a passenger sitting on the vehicle seat can lie down in a pleasant and comfortable manner.

It is furthermore proposed that the lying surface have at least one lying surface longitudinal direction which is oriented inclined to the seat unit longitudinal direction. In particular, a passenger lying on the lying surface lies at an angle to the seat unit longitudinal direction, preferably to the sitting direction, in particular to the direction of flight. Preferably, the passenger lying on the lying surface lies at an angle across the seat bottom unit of the seat unit. In particular, the passenger lying on the lying surface lies obliquely across the seat bottom unit of the seat unit. The phrase stating that the lying surface longitudinal direction is oriented at an angle to the seat unit longitudinal direction is intended, in particular, to mean that the lying surface longitudinal direction of the lying surface and the seat unit longitudinal direction of the seat unit intersect. In particular, the lying surface longitudinal direction of the lying surface and the seat unit longitudinal direction of the seat unit enclose a smallest angle in a range of from 0° (excluding 0°) to 90°, inclusive. The lying surface longitudinal direction of the lying surface and the seat unit longitudinal direction of the seat unit preferably enclose a smallest angle in a range of from 15° to 45°. In particular, the lying surface longitudinal, direction of the lying surface and the seat unit longitudinal direction of the seat unit enclose a smallest angle of a least substantially 30°. The term "smallest angle" is intended, in particular, to mean an angle at an intersection between two straight lines, having a magnitude which is smaller than or equal to a magnitude of a largest angle at the intersection between the two straight lines. In particular, a sum of the smallest angle and the largest angle is at least substantially 180°. In this context, the phrase "at least substantially" is intended, in particular, to mean that a deviation from a predetermined value is, in particular, less than 25%, preferably less than 10%, and particularly preferably less than 5% of the predetermined value. By means of an embodiment according to the invention, it is advantageously possible to make optimum use of an available space, in particular a space available in a passenger cabin. In particular, a maximum possible lying surface for a passenger can be provided in the available space, in particular even when the seats are arranged close together in the passenger cabin in which the vehicle seat is arranged.

It is furthermore proposed that the bench unit have at least two different bench unit transverse extents. In particular, the bench unit has at least two different bench unit transverse extents in respect of a bench unit transverse direction. The bench unit preferably has one of the bench unit transverse extents in a rear section in relation to a bench unit longitudinal direction, in particular in the bench unit section, and has another of the bench unit transverse extents in a further bench unit section arranged offset in the bench unit longitudinal direction. In particular, the further bench unit transverse extent is less than said bench unit transverse extent. The further bench unit transverse extent is preferably less than said bench unit transverse extent by a factor of more than two. In particular, the further bench unit transverse extent is less than said bench unit transverse extent by a factor of more than three. The further bench unit transverse extent is preferably less than said bench unit transverse extent by a factor of more than four. The term "bench unit longitudinal direction" is intended, in particular, to mean a direction which is oriented at least substantially parallel to a bench unit longitudinal extent. The term "bench unit transverse direction" is intended, in particular, to mean a direction oriented at least substantially parallel to a bench unit transverse extent. The term "bench unit longitudinal extent" is intended, in particular, to mean an extent which assumes a maximum value when the bench unit surface is projected into a plane. In particular, a magnitude of the bench unit longitudinal extent is greater than or equal to a magnitude of the bench unit transverse extent. The term "bench unit transverse extent" is intended, in particular, to mean an extent which assumes a magnitude less than or equal to the magnitude of the bench unit longitudinal extent when the bench unit surface is projected into the plane. By means of an embodiment according to the invention, a vehicle seat which is matched to the needs of a passenger using the vehicle seat and is convenient and comfortable can advantageously be achieved.

It is furthermore proposed that the bench unit, starting from the bench unit section of the bench unit, have a tapering profile in relation to a bench unit longitudinal direction. In particular, the bench unit has, in the bench unit longitudinal direction, a tapering bench unit section, the bench unit transverse extent of which decreases continuously, starting from the bench unit transverse extent in the bench unit section, in particular the rear section, as far as the further bench unit transverse extent in the further section. The bench unit section of the bench unit preferably has a bench unit transverse extent of a magnitude which is greater than a magnitude of a bench unit transverse extent of the bench unit in the further section of the bench unit. By means of an embodiment according to the invention, it is advantageously possible to achieve a tapering profile of the bench unit transverse extent, thereby making it possible to achieve a bench unit which is pleasantly matched to a body geometry of a passenger lying on the bench unit in relation to the bench unit transverse direction. It is thereby possible to provide a comfortable lying surface.

It is furthermore proposed that the bench unit have at least one bench unit longitudinal extent which is oriented inclined to the seat unit longitudinal direction. In particular, the bench unit has at least one bench unit longitudinal direction which is oriented inclined to the seat unit longitudinal direction. The bench unit longitudinal direction is preferably oriented substantially parallel to the bench unit longitudinal extent. The phrase stating that the bench unit longitudinal direction is oriented "at an angle" to the seat unit longitudinal direction is intended, in particular, to mean that the bench unit longitudinal direction of the bench unit and the seat unit longitudinal direction of the seat unit intersect. In particular, the bench unit longitudinal direction of the bench unit and the seat unit longitudinal direction of the seat unit enclose an angle in a range of from 0° (excluding 0°) to 90° inclusive. The bench unit longitudinal direction of the bench unit and the seat unit longitudinal direction of the seat unit preferably enclose an angle in a range of from 15° to 55°. By arranging the bench unit at an angle relative to the seat unit in accordance with the invention, it is advantageously possible to adapt the vehicle seat flexibly to local circumstances where the vehicle seat is to be mounted. It is furthermore advantageously possible to enable improved arrangement of the bench unit relative to the seat unit in terms of comfort for a passenger, and it is thereby possible to enhance the comfort of the passenger.

It is furthermore proposed that the seat unit have at least one lower leg support unit and the at least one seat bottom unit, which are arranged at least substantially in one plane in at least one seat position. The phrase stating that the lower leg support unit and the seat bottom unit are "arranged at least substantially in one plane" in at least one seat position is intended, in particular, to mean that the lower leg support unit has a lower leg support unit surface, more than 70%, preferably more than 80%, and, in particular, more than 90%, of which is arranged in a plane defined by the seat bottom unit. By means of an embodiment according to the invention, it is advantageously possible, in the seat position, for a passenger sitting on the seat bottom unit of the seat unit to rest his legs on the lower leg support unit of the seat unit with his legs comfortably stretched out.

It is furthermore proposed that the lower leg support unit and the seat bottom unit form the lying surface with the bench unit surface in the seat position. In particular, the passenger lying on the lying surface lies at an angle across the seat bottom unit of the seat unit. Preferably, the passenger lying on the lying surface lies obliquely across the seat bottom unit of the seat unit. The passenger lying on the lying surface preferably lies at an angle across the lower leg support unit of the seat unit. In particular, the passenger lying on the lying surface lies obliquely across the lower leg support unit of the seat unit. In particular, the passenger lying on the lying surface lies at an angle across the seat bottom unit and the lower leg support unit of the seat unit. The passenger lying on the lying surface preferably lies obliquely across the seat bottom unit and the lower leg support unit of the seat unit. By means of an embodiment according to the invention, it is advantageously possible to provide a pleasantly large lying surface and hence to allow the passenger lying on the lying surface a maximum amount of comfort while lying down.

It is furthermore proposed that the bench unit, in at least one seat position, have at least one bench unit section which, starting from the seat unit, is arranged in front of the seat unit in relation to the seat unit longitudinal direction. In particular, a straight line oriented at least substantially parallel to the seat unit longitudinal direction, in particular to the sitting direction, starting from a central point of the seat bottom unit of the seat unit and extending in the seat unit longitudinal direction, first of all intersects a side region of the side unit, said side region being arranged remote from the backrest unit, and, as it progresses further in the sitting direction, intersects the bench unit section of the bench unit. The bench unit section of the bench unit is preferably arranged in front of the seat unit in relation to the seat unit longitudinal direction in the seat position, starting from the seat bottom unit of the seat unit. In particular, the bench unit section of the bench unit is arranged in front of the seat unit in relation to the seat unit longitudinal direction in the seat position, starting from a passenger sitting on the seat unit, in particular on the seat bottom unit of the seat unit. By means of an embodiment according to the invention, it is advantageously possible for a passenger sitting on the seat unit to rest his legs comfortably on the bench unit section of the bench unit arranged in front of the seat unit in relation to the seat unit longitudinal direction.

It is furthermore proposed that the seating device have at least one partition wall, which has an at least substantially undulating contour in at least one cross sectional plane. As an alternative, it is conceivable for the partition wall to have an at least substantially straight contour, in particular a contour designed at least substantially as a straight line. In particular, the partition wall is arranged on an extension of the backrest unit. The term "partition wall" is intended, in particular, to mean a wall which is provided to allow screening, in particular screening relative to other vehicle seats, in at least one installed state. In particular, the partition wall is provided for the purpose of delimiting a region at the disposal of a passenger. The partition wall is preferably provided for the purpose of protecting a private sphere of the passenger using the vehicle seat, in particular from the view of other passengers using vehicle seats adjacent to said vehicle seat. The term "undulating contour" is intended, in particular, to mean a contour which can be described by a mathematical sine function given by $f(x)=a \sin(bx)$. In particular, the factor a modifies an amplitude of the mathematical sine function. The factor b preferably modifies a period length, in particular a frequency, of the mathematical sine function. In particular, the factors a and b are real numbers greater than zero. The phrase "at least substantially undulating contour" is intended, in particular, to mean a contour which deviates from the mathematical sine function $f(x)=a \sin(bx)$ in a direction at least substantially parallel to an amplitude of the mathematical sine function $f(x)=a \sin(bx)$ by less than 10%, preferably by less than 7%, and, in particular, by less than 5% of a magnitude of the amplitude of 2a of the mathematical sine function $f(x)=a \sin(bx)$ and which deviates from the mathematical sine function $f(x)=a \sin(bx)$ in a direction at least substantially parallel to a period length of the mathematical sine function $f(x)=a \sin(bx)$ by less than 10%, preferably by less than 7%, and, in particular, by less than 5% of a magnitude of the period length of $2\pi/b$ of the mathematical sine function $f(x)=a \sin(bx)$. By means of an embodiment according to the invention, it is advantageously possible to screen off a region of the vehicle seat, thereby making it possible to protect a private sphere of a passenger using the vehicle seat in a simple and reliable manner.

A system having at least one vehicle seat according to the invention and having at least one further seat arranged behind said vehicle seat in relation to the seat unit longitudinal direction, in particular having at least one further vehicle seat according to the invention arranged behind said vehicle seat in relation to the seat unit longitudinal direction, is furthermore proposed. In particular, the further seat is designed as the further vehicle seat according to the invention. By means of an embodiment according to the invention, it is advantageously possible to achieve a comfortable system comprising at least two, preferably a plurality of vehicle seats arranged one behind the other in relation to the seat unit longitudinal direction. It is thereby possible to provide at least two, preferably several, passengers with the opportunity to sit and/or lie comfortably.

A passenger cabin, in particular an aircraft passenger cabin, having at least one vehicle seat according to the invention is furthermore proposed. The vehicle seat has the seating device, which is provided for installation in the passenger cabin. In particular, the seating device has at least one fitting body, which is provided for the purpose of fastening the seating device in the passenger cabin. The passenger cabin preferably has at least one fastening rail, which is provided for the purpose of at least partially accommodating the fitting body in an installed state of the seating device. In particular, the fastening rail is anchored at least substantially in a fixed manner in the passenger cabin. The seating device is preferably provided for installation in the passenger cabin by means of the fitting body, in particular in the passenger cabin by means of the fastening rail, in particular, the fastening rail is oriented at least substantially parallel, to a passenger cabin longitudinal direction of the passenger cabin. The fitting body preferably has a fitting body longitudinal direction which is oriented at least substantially parallel to the seat unit, in particular to a seat bottom unit of the seat unit. In particular, the fitting body longitudinal direction is oriented at least substantially parallel to the seat unit longitudinal direction, in particular to a seat bottom unit longitudinal direction of the seat bottom unit. The fitting body longitudinal direction is preferably oriented at least substantially parallel to the passenger cabin longitudinal direction, in particular, the fitting body longitudinal direction is oriented at least substantially parallel, to at least one fastening rail longitudinal direction of the fastening rail. In particular, the seating device is provided for installation in the passenger cabin with the seat unit longitudinal direction oriented at least substantially parallel to the passenger cabin longitudinal direction. In particular, an angle, in particular a smallest angle, between the seat unit longitudinal direction and the passenger cabin longitudinal direction is at least substantially 0°. The lying surface longitudinal direction preferably encloses an angle, in particular a smallest angle, of at least substantially 30° with the passenger cabin longitudinal direction. In this context, the phrase "at least substantially" is intended, in particular, to mean that a deviation from a, predetermined value is, in particular, less than 25%, preferably less than 10%, and particularly preferably less than 5% of the predetermined value. By means of an embodiment according to the invention, it is advantageously possible to achieve a comfortable passenger cabin. It is furthermore advantageously possible to ensure that a passenger sitting on the seating device has direct access to a passenger cabin aisle, irrespective of a position of the seating device in the passenger cabin.

It is not the intention here to restrict the vehicle seat according to the invention to the use and embodiment described above. In particular, the vehicle seat according to the invention can have a different number of individual elements, components and units from that mentioned herein in order to perform a function described herein.

DRAWINGS

Further advantages will become apparent from the following description of the drawings. In the drawings, an illustrative embodiment of the invention is shown. The drawings, the description and the claims contain numerous features in combination. A person skilled in the art will expediently also consider the features individually and combine them into worthwhile further combinations.

DESCRIPTION OF THE ILLUSTRATIVE EMBODIMENT

Figure 1:
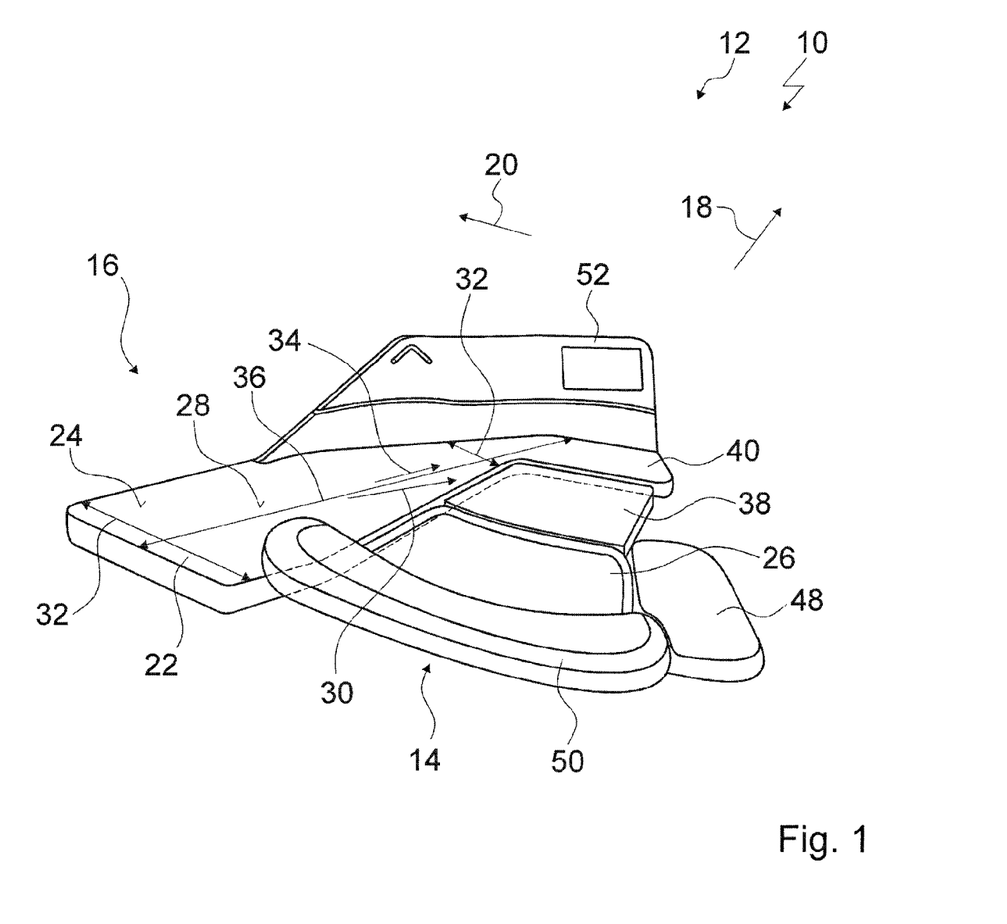
FIG. 1 shows a vehicle seat according to the invention in a perspective view.

FIG. 1 shows, in a perspective view, a vehicle seat 10 according to the invention having a seating device 12, which has a seat unit 14 and a bench unit 16, which is arranged in a transverse direction 20 oriented substantially perpendicular to a seat unit longitudinal direction 18 at one side of the seat unit 14. The vehicle seat 10 is designed as an aircraft seat. The seat unit 14 has a seat bottom unit 26, which is provided as a seating surface for a passenger (not shown) sitting on the seat unit 14. Moreover, the seat unit 14 has an armrest unit 48, which is arranged on a side of the seat unit 14 remote from the first side of the seat unit. 14 in relation to the transverse direction 20. More specifically, the armrest unit. 48 is arranged on a side of the seat unit 14 remote from the bench unit 16 in relation to the transverse direction 20. The seat unit 14 has a lower leg support unit 38, which is mounted pivotably on the seat bottom unit 26. The lower leg support unit 38 has a bearing surface for the lower legs (not shown) of the passenger. The seat unit 14 has the lower leg support unit 38 and the seat bottom unit 26, which are arranged substantially in one plane in one seat position. FIG. 1 shows the seat position in which the lower leg support unit 38 and the seat bottom unit 26 are arranged substantially in the plane. In the seat position illustrated in FIG. 1, the vehicle seat 10 is arranged in a comfort position. The comfort position shown in FIG. 1 is referred to below as the seat position.

The seat unit 14 has a backrest unit 50, which is mounted pivotably on the seat bottom unit 26. The backrest unit 50 and the lower leg support unit 38 are mounted on the seat unit 14 on sides of the seat unit 14 which face away from one another. The seating device 12 has a partition wall 52, which has a substantially undulating contour in one cross-sectional plane. The partition wall 52 is provided to allow screening relative to other vehicle seats 10. In particular, the partition wall. 52 is provided for the purpose of delimiting a region at the disposal of the passenger. The partition wall 52 is arranged in front of the seat unit 14 in relation, to the seat unit longitudinal direction 18. The seating device 12 has a monitor, which is provided for the purpose of displaying an entertainment program. The monitor is furthermore provided for the purpose of displaying onboard information. The monitor is arranged on the partition wall 52. The seating device 12 has a coat hook, on which the passenger can hang his clothing. The coat hook is arranged on the partition wall 52. The seating device 12 furthermore has storage spaces (not shown) for documents and/or luggage belonging to the passenger. For example, it is conceivable for the storage spaces to be arranged under the bench unit 16.

In the seat position, the bench unit 16 has a bench unit section 22 which projects rearward beyond the seat unit 14 in relation to the seat unit longitudinal direction 18. In bench unit section 22, the bench unit 16 has a bench unit transverse extent 32 which is oriented inclined to the transverse direction 20. The bench unit section 22 projects beyond the seat unit 14 on a side of the seat unit 14 which faces away from the partition wall 52. More specifically, the bench unit section 22 projects beyond the seat unit 14 on that side of the seat unit 14 on which the backrest unit 50 is mounted on the seat unit 14. Starting from bench unit section 22, the bench unit transverse extent 32 has a profile which tapers in relation to a bench unit longitudinal, direction 34. The bench unit 16 has the profile which tapers in relation to the bench unit longitudinal direction 34, starting from bench unit section 22 of the bench unit 16. A magnitude of the bench unit transverse extent 32 decreases continuously when viewed in the bench unit longitudinal direction 34. The bench unit 16 has a plurality of different bench unit transverse extents 32.

As already mentioned above, the partition wall 52 is arranged in front of the seat unit 14 in relation to the seat unit longitudinal direction 18. Starting from the seat bottom unit 26 of the seat unit 14, the partition wall 52 is arranged in front of the seat unit 14 as it progresses in the seat unit longitudinal direction 18. The passenger sitting on the seat bottom unit 26 looks at the partition wall 52 when looking in the seat unit longitudinal direction 18. A bench unit section 40 is arranged between the partition wall 52 and the seat bottom unit 26 of the seat unit 14. The passenger sitting on the seat bottom unit 26 looks at bench unit section 40 when looking in the seat unit longitudinal direction 18. Starting from the seat bottom unit 26 of the seat unit 14, bench unit section 40 is arranged in front of the seat unit 14 as it progresses in the seat unit longitudinal direction 18. Starting from the seat bottom unit 26 of the seat unit. 14, bench unit section 40 is furthermore arranged in front of the partition wall 52 as it progresses in the seat unit longitudinal direction 18. In the seat position, the bench unit 16 has bench unit section 40, which is arranged in front of the seat unit 14 in relation to the seat unit longitudinal direction 18, starting from the seat unit 14.

The seat unit longitudinal direction. 18 is oriented substantially parallel to a sitting direction. Moreover, the seat unit longitudinal direction 18 is oriented substantially parallel to a direction of flight. The bench unit 16 has a bench unit longitudinal extent 36 which is oriented inclined to the seat unit longitudinal direction 18. Starting from the bench unit section 22 which projects rearward beyond the seat unit 14 in relation to the seat unit longitudinal direction 18, the bench unit longitudinal extent 36 extends as far as the bench unit section 40 which is arranged in front of the seat unit 14 in relation to the seat unit longitudinal direction 18. The bench unit 16 directly adjoins the partition wall 52 in one region. More specifically, the bench unit 16 adjoins the partition wall 52 in a region of the bench unit 16 which is at the front in relation to the seat unit longitudinal direction 18. The bench unit 16 adjoins the partition wall 52 in a region of the bench unit 16 which is at the front in relation to the bench unit longitudinal direction 34.

The bench unit 16 has a bench unit surface 24 which forms, in the seat position, a lying surface 28 with the seat bottom unit 26 of the seat unit 14. The bench unit surface 24 is arranged substantially in a plane defined by the seat bottom unit 26. This enables the passenger to move without problems from a position sitting on the seat unit 14 into a position lying on the bench unit 16. As already mentioned at the outset, the lower leg support unit 38 is mounted pivotably on the seat bottom unit 26 of the seat unit 14. The lower leg support unit 38 can be pivoted into a position in which the lower leg support unit 38 is arranged in the plane defined by the seat bottom unit 26. In the seat position, the lower leg support unit 38 and the seat bottom unit 26 form the lying surface 28 with the bench unit surface 24. Starting from bench section 22, the lying surface 28 extends obliquely across the seat unit 14. More specifically, starting from bench unit section 22, the lying surface 28 extends obliquely across the seat bottom unit 26 and the lower leg support unit 38. The lying surface 28 has a lying surface longitudinal direction 30 which is oriented inclined to the seat unit longitudinal direction 18. In the illustrative embodiment under consideration, the lying surface longitudinal direction 30 encloses an angle of substantially 30° with the seat unit longitudinal direction 18. A passenger lying on the lying surface 28 lies obliquely to the seat unit longitudinal direction 18. More specifically, the passenger lying on the lying surface 28 lies obliquely to the direction of flight.

The vehicle seat 10 is provided for installation in a passenger cabin 46. The vehicle seat 10 has the seating device 12. The seating device 12 is provided for installation in the passenger cabin 46 with the seat unit longitudinal direction 18 oriented, substantially parallel to a passenger cabin longitudinal direction 62. The lying surface longitudinal direction 30 is oriented inclined to the passenger cabin longitudinal direction 62. The lying surface longitudinal direction encloses an angle of substantially 30° with the passenger cabin longitudinal direction 62.

Figure 2:
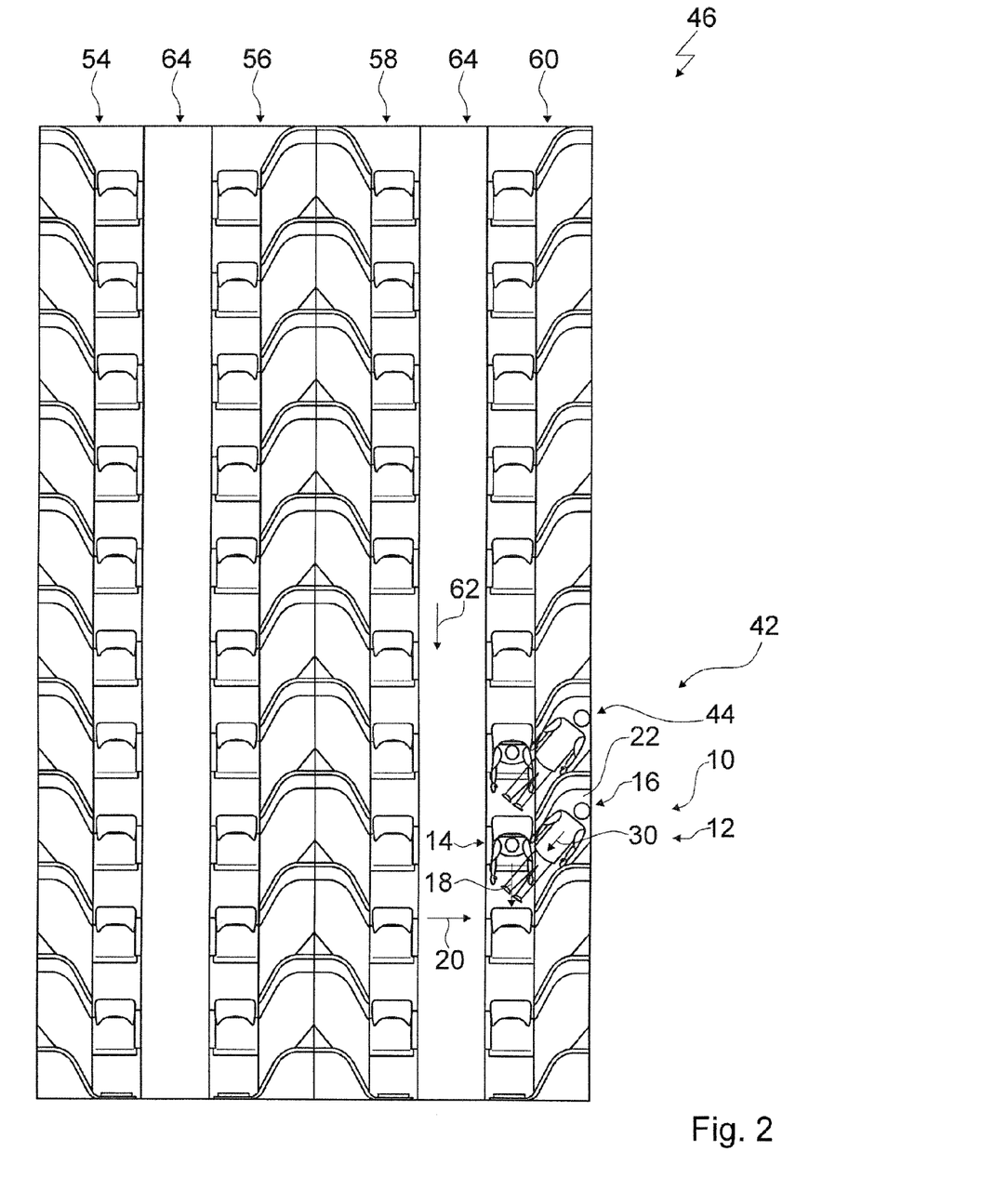
FIG. 2 shows a passenger cabin according to the invention with a multiplicity of vehicle seats according to the invention as shown in FIG. 1.

FIG. 2 shows the passenger cabin 46 according to the invention, more specifically an aircraft passenger cabin, having a multiplicity of vehicle seats 10 according to the invention. The passenger cabin 46 is designed as an aircraft passenger cabin. For the sake of clarity, only one of the vehicle seats 10 is provided with reference signs in FIGS. 2 and 3. For the sake of clarity, there is furthermore no detailed illustration of the vehicle seats 10 according to FIG. 1 in FIGS. 2 and 3, and the vehicle seats 10 are shown only schematically, for which reason a number of features of the vehicle seat 10 shown in FIG. 1 are missing. FIG. 2 shows that the vehicle seats 10 are arranged in four passenger cabin rows 54, 56, 58, 60. The respective passenger cabin rows 54, 56, 58, 60 are each oriented parallel to the passenger cabin longitudinal direction 62. At the same time, two of the passenger cabin rows 54, 60 are each arranged at an edge of the passenger cabin 46 when viewed in relation to a passenger cabin transverse direction oriented perpendicular to the passenger cabin longitudinal direction 62. Passenger cabin rows 56, 58 are arranged in a center of the passenger cabin 46. Passenger cabin rows 56, 58 are each separated from passenger cabin rows 54 and 60, respectively, by a passenger cabin aisle 64. Each passenger cabin aisle 64 is oriented parallel to the passenger cabin longitudinal direction 62. The passenger cabin longitudinal direction 62 is oriented parallel to the direction of flight. The passenger cabin transverse direction is oriented parallel to the transverse direction 20.

FIG. 2 shows a passenger cabin seat configuration referred to as 40 PAX. In the passenger cabin, seat configuration referred to as 40 PAX, a total of 40 vehicle seats 10 are arranged in the passenger cabin 46. Thus, a total of ten vehicle seats 10 is arranged in each of the four passenger cabin rows 54, 56, 58, 60. The respective seating device 12 of the respective vehicle seat 10 is installed in the passenger cabin 46 with a seat unit longitudinal direction 18 oriented in each case substantially parallel to the passenger cabin longitudinal direction 62. The respective seat unit longitudinal direction 18 of the respective seat unit 14 is in each case oriented substantially parallel to the passenger cabin longitudinal direction 62. The respective seat unit longitudinal direction 10 of the respective seat unit 14 in each case encloses a smallest angle of 0° with the passenger cabin longitudinal direction 62. The respective lying surface longitudinal direction 30 in each case encloses a smallest angle of 30° with the passenger cabin longitudinal direction 62. A respective spacing between two vehicle seats 10 arranged one behind the other in relation to the passenger cabin longitudinal direction 62 is in each case about 107 cm in the passenger cabin seat configuration referred to as 40 PAX. The respective angles and spacings are variable and can be varied according to requirements and circumstances in a particular passenger cabin. Combinations that appear worthwhile to a person skilled in the art are conceivable here.

Further passenger cabin seat configurations are conceivable as an alternative to the passenger cabin seat configuration referred to as 40 PAX. In each of the passenger cabin seat configurations, the above-described angles between the respective seat unit longitudinal direction 18 and the passenger cabin longitudinal direction 62 and between the respective lying surface longitudinal direction 30 and the passenger cabin longitudinal direction 62 are the same as in the passenger cabin seat configuration referred to as 40 PAX. However, the respective spacings between the respective vehicle seats 10 vary according to the passenger cabin seat configuration. It is thereby advantageously possible to achieve any desired density of vehicle seats 10 in the passenger cabin 46. In a passenger cabin seat configuration referred to as 44 PAX, a respective spacing between two vehicle seats 10 arranged one behind the other in relation to the passenger cabin longitudinal direction 62 is in each case about 97 cm. In the passenger cabin seat configuration referred to as 44 PAX, a total of 44 vehicle seats 10 is arranged in the passenger cabin 46. Thus, a total of eleven vehicle seats 10 is arranged in each of the four passenger cabin rows 54, 56, 58, 60.

In a passenger cabin seat configuration referred to as 32 PAX, a respective spacing between two vehicle seats 10 arranged one behind the other in relation to the passenger cabin longitudinal direction 62 is in each case about 135 cm. In the passenger cabin seat configuration referred to as 32 PAX, a total of 32 vehicle seats 10 is arranged in the passenger cabin 46. Thus, a total of eight vehicle seats 10 is arranged in each of the four passenger cabin rows 54, 56, 58, 60. In a passenger cabin seat configuration referred to as 36 PAX, a respective spacing between two vehicle seats 10 arranged one behind the other in relation to the passenger cabin longitudinal direction 62 is in each case about 120 cm. In the passenger cabin seat configuration referred to as 36 PAX, a total of 36 vehicle seats 10 is arranged in the passenger cabin. 46. Thus, a total of nine vehicle seats 10 is arranged in each of the four passenger cabin rows 54, 56, 58, 60.

Figure 3:
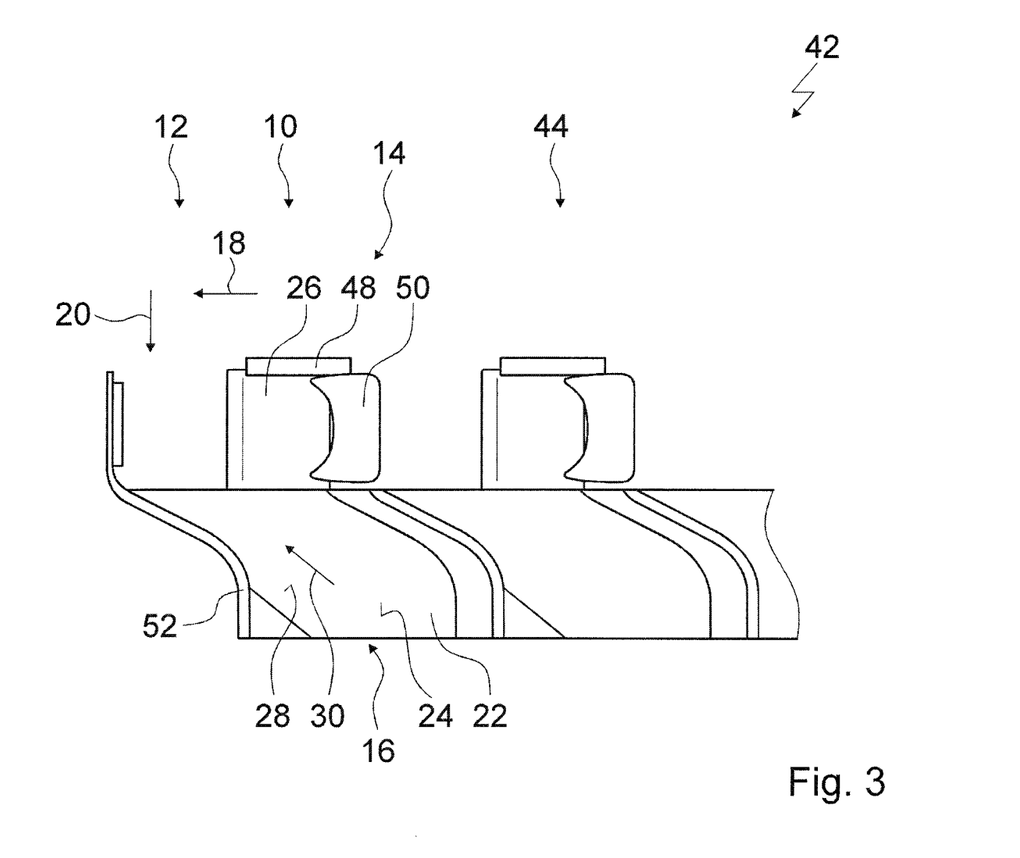
FIG. 3 shows an enlarged detail of FIG. 2.

FIG. 3 shows an enlarged detail of FIG. 2. The enlarged detail of FIG. 2 is thus designed as a section of the passenger cabin seat configuration referred to as 40 PAX. Moreover, FIG. 3 shows a system 42 according to the invention having the vehicle seat 10 according to the invention and having a further seat. 44 arranged behind vehicle seat. 10 in relation to the seat unit longitudinal direction 18, more specifically having a further vehicle seat 10 according to the invention arranged behind the vehicle seat 10 in relation to the seat unit longitudinal direction 18. The further seat 44 is designed as a further vehicle seat 10.

As already mentioned, FIG. 3 shows clearly that the respective seating device 12 in each case has the partition wall 52, which in each case has an undulating contour in one cross-sectional plane in each case. It can likewise be seen that the partition wall 52 screens off a space at the disposal of the passenger using the seating device 12. The partition wall 52 partially forms the space at the disposal of the passenger using the seating device 12. FIG. 3 furthermore clearly shows an angled orientation of the seat unit longitudinal direction 18 and of the lying surface longitudinal direction 30.

It is conceivable for the seat unit 14 to be movable into a seat position in which the seat unit 14 has a substantially Z-shaped profile when considered in a side view. More specifically, it is conceivable for the Z-shaped profile to be set by the passenger sitting on the seating device 12. This Z-shaped profile is referred to as the lazy-Z position. It is conceivable for the seat position referred to as the lazy-Z position to be set by means of the seat unit 14 of pivotable design. More specifically, it is conceivable for the seat position referred to as the lazy-Z position to be set by means of a combined pivoting movement of the seat bottom unit 26, of the lower leg support unit 38 and of the backrest unit 50. It is conceivable here for the Z-shaped profile to be set by the passenger sitting on the seating device 12.

REFERENCE SIGNS

10 vehicle seat
12 seating device
14 seat unit
16 bench unit
18 seat unit longitudinal direction
20 transverse direction
22 bench unit section
24 bench unit surface
26 seat bottom unit
28 lying surface
30 lying surface longitudinal direction
32 bench unit transverse extent
34 bench unit longitudinal direction
36 bench unit longitudinal extent
38 lower leg support unit
40 bench unit section
42 system
44 further seat
46 passenger cabin
48 armrest unit
50 backrest unit
52 partition wall
54 passenger cabin row
56 passenger cabin row
58 passenger cabin row
60 passenger cabin row
62 passenger cabin longitudinal, direction
64 passenger cabin aisle

The invention claimed is:

1. An aircraft seat, having at least one seating device, the at least one seating device has at least one seat unit and at least one bench unit, the at least one bench unit is, in at least one upright seat position, in which a backrest unit of the seat unit is oriented at least substantially perpendicular to a floor, arranged at one side of the seat unit in a transverse direction oriented at least substantially perpendicular to a seat unit longitudinal direction, wherein the bench unit has at least one rearward bench unit section which projects, in the at least one upright seat position of the seat unit and in a comfort position, rearward beyond the seat unit in relation to the seat unit longitudinal direction, the at least one bench unit has a bench unit surface which forms, in the comfort position, a lying surface with a seating surface provided by a seat bottom unit and a lower leg support unit of the at least one seat unit, said lying surface is adapted for a supine passenger who lies thereon obliquely across the seat bottom unit of the seat unit, and wherein in the comfort position the seat bottom unit and the lower leg support unit form the lying surface with the bench unit surface and the backrest unit does not form any part of the lying surface in the comfort position, wherein the lower leg support unit and the seat bottom unit and the bench unit surface are arranged at least substantially in one plane in the comfort position, and the backrest unit remains in the upright seat position in the comfort position.

2. The aircraft seat according to claim 1, wherein the lying surface has at least one lying surface longitudinal direction which is oriented inclined to the seat unit longitudinal direction.

3. The aircraft seat according to claim 2, wherein the bench unit has at least two different bench unit transverse extents.

4. The aircraft seat according to claim 2, wherein the bench unit has at least one bench unit longitudinal extent which, in an assembled state of the aircraft seat, is permanently oriented inclined to the seat unit longitudinal direction.

5. The aircraft seat according to claim 2, wherein the bench unit, in the comfort position, has at least one forward bench unit section which, starting from the seat unit, is arranged in front of the seat unit in relation to the seat unit longitudinal direction.

6. The aircraft seat according to claim 1, wherein the bench unit has at least two different bench unit transverse extents.

7. The aircraft seat according to claim 6, wherein the bench unit, starting from the at least one rearward bench unit section of the bench unit has a tapering profile in relation to a bench unit longitudinal direction.

8. The aircraft seat according to claim 1, wherein the bench unit has at least one bench unit longitudinal extent which, in an assembled state of the aircraft seat, is permanently oriented inclined to the seat unit longitudinal direction.

9. The aircraft seat according to claim 1, wherein the seat unit has the lower leg support unit and the at least one seat bottom unit, the lower leg support unit is arranged at a front edge of the seat bottom unit, at least when the lower leg support unit and the seat bottom unit are arranged at least substantially in one plane in the comfort position.

10. The aircraft seat according to claim 9, wherein the lower leg support unit and the seat bottom unit form the lying surface with the bench unit surface in the comfort position.

11. The aircraft seat according to claim 1, wherein the bench unit, in the comfort position, has at least one forward bench unit section which, starting from the seat unit, is arranged in front of the seat unit in relation to the seat unit longitudinal direction.

12. A system having at least a first aircraft seat according to claim 1 and a second aircraft seat similar to the first aircraft seat, the second aircraft seat is arranged behind said first aircraft seat in relation to the seat unit longitudinal direction.

13. An aircraft passenger cabin having at least one aircraft seat according to claim 1.

14. A system having at least a first aircraft seat according to claim 1 and a second aircraft seat similar to the first aircraft seat, said second aircraft seat is arranged behind said first aircraft seat in relation to the seat unit longitudinal direction of said first aircraft seat, wherein the lying surface of said first aircraft seat and the lying surface of said second aircraft seat overlap at least partially in the seat longitudinal direction.

15. The aircraft seat according to claim 1, the aircraft seat further comprises the seat bottom unit which is provided as a seating surface for a passenger sitting on the seat unit, and a backrest unit which is mounted pivotably on the seat bottom unit.

16. The aircraft seat according to claim 1, wherein a shape of a base of the aircraft seat is a parallelogram with no right angles.

17. The aircraft seat according to claim 1, wherein the bench unit is arranged permanently at one side of the seat unit.

18. The aircraft seat according to claim 1, wherein the bench unit is arranged to project permanently rearward beyond the seat unit in relation to the seat unit longitudinal direction.

19. An aircraft seat, having at least one seating device, the at least one seating device has at least one seat unit and at least one bench unit, the at least one bench unit is, in at least one upright seat position, in which a backrest unit of the seat unit is oriented at least substantially perpendicular to a floor, arranged at one side of the seat unit in a transverse direction oriented at least substantially perpendicular to a seat unit longitudinal direction, wherein the bench unit has at least one rearward bench unit section which projects, in the at least one upright seat position of the seat unit and in a comfort position, rearward beyond the seat unit in relation to the seat unit longitudinal direction, the at least one bench unit has a bench unit surface which forms, in the comfort position, a lying surface with a seating surface provided by a seat bottom unit of the at least one seat unit, said lying surface is adapted for a supine passenger who lies thereon obliquely across the seat bottom unit of the seat unit, and wherein in the comfort position the seat bottom unit forms the lying surface with the bench unit surface and substantially without the backrest unit, wherein the seat bottom unit and the bench unit surface are arranged at least substantially in one plane in the comfort position, and the backrest unit remains in the upright seat position in the comfort position.

* * * * *